US012651988B2

(12) United States Patent
Teramoto et al.

(10) Patent No.: US 12,651,988 B2
(45) Date of Patent: Jun. 9, 2026

(54) ROTARY MACHINE CONTROL APPARATUS

(71) Applicant: Mitsubishi Electric Corporation, Tokyo (JP)

(72) Inventors: Kota Teramoto, Tokyo (JP); Toshiki Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 189 days.

(21) Appl. No.: 18/579,614

(22) PCT Filed: Aug. 23, 2021

(86) PCT No.: PCT/JP2021/030851
§ 371 (c)(1),
(2) Date: Jan. 16, 2024

(87) PCT Pub. No.: WO2023/026332
PCT Pub. Date: Mar. 2, 2023

(65) Prior Publication Data
US 2024/0333183 A1 Oct. 3, 2024

(51) Int. Cl.
*H02P 21/00* (2016.01)
*B60L 15/20* (2006.01)
(Continued)

(52) U.S. Cl.
CPC .............. *H02P 21/18* (2016.02); *B60L 15/20* (2013.01); *B61C 3/00* (2013.01); *H02P 21/22* (2016.02);
(Continued)

(58) Field of Classification Search
CPC ...... H02P 21/22; H02P 21/18; H02P 2203/03; H02P 6/28; H02P 2203/11; H02P 29/50
See application file for complete search history.

(56) References Cited

U.S. PATENT DOCUMENTS 9,059,653 B2 6/2015 Shimada et al.
2004/0257030 A1 12/2004 Taguchi et al.
(Continued)

FOREIGN PATENT DOCUMENTS

DE 10114293 B3 4/2004
EP 2515431 A2 10/2012
(Continued)

OTHER PUBLICATIONS

International Search Report (PCT/ISA/210) with English translation and Written Opinion (PCT/ISA/237) mailed on Nov. 16, 2021, by the Japanese Patent Office as the International Searching Authority for International Application No. PCT/JP2021/030851.
(Continued)

*Primary Examiner* — Karen Masih
(74) *Attorney, Agent, or Firm* — BUCHANAN, INGERSOLL & ROONEY PC

(57) ABSTRACT

A control apparatus includes: a current detection unit detecting rotary machine current flowing to a rotary machine; a position estimation unit calculating an estimate value of a rotor position based on the rotary machine current; a current control unit generating a first voltage command being a command value of rotary machine voltage for driving the rotary machine, based on a detection value of the rotary machine current and the estimate value of the rotor position; a position estimation voltage generation unit generating high-frequency voltage based on rotation information regarding direction of rotation of a rotor, the high-frequency voltage being a position estimation voltage for estimating the rotor position and having frequency higher than frequency of the first voltage command; and a voltage application device applying driving voltage to the rotary machine based on a second voltage command obtained by superim-
(Continued)

position of the position estimation voltage on the first voltage command.

12 Claims, 9 Drawing Sheets

(51) Int. Cl.
*B61C 3/00* (2006.01)
*H02P 21/18* (2016.01)
*H02P 21/22* (2016.01)

(52) U.S. Cl.
CPC ....... *B60L 2200/26* (2013.01); *H02P 2207/05* (2013.01)

(56) References Cited

U.S. PATENT DOCUMENTS

| | | | |
|---|---|---|---|
| 2017/0110999 A1 | 4/2017 | Shimada et al. | |
| 2021/0320603 A1 | 10/2021 | Takahashi et al. | |

FOREIGN PATENT DOCUMENTS

| | | | | |
|---|---|---|---|---|
| EP | 3972118 A1 * | 3/2022 | .............. | H02P 21/18 |
| JP | H09140001 A | 5/1997 | | |
| JP | 2004343833 A | 12/2004 | | |
| JP | 2012228058 A | 11/2012 | | |
| JP | 2013090552 A | 5/2013 | | |
| WO | 2015159694 A1 | 10/2015 | | |

OTHER PUBLICATIONS

Notice of Reasons for Refusal for corresponding Japanese Patent Application No. 2023-543496 dated Jan. 9, 2024.
Office Action dated Dec. 15, 2025, issued in the corresponding German Patent Application No. 112021008138.1, 6 pages including 3 pages of English Translation.
Office Action dated Aug. 27, 2025, issued in the corresponding German Patent Application No. 112021008138.1, 9 pages including 4 pages of English Translation.
Examination Report dated Feb. 4, 2026, issued in the corresponding Indian Patent Application No. 202427008672. (7 pages).

* cited by examiner

|  | TRAIN CAR DIRECTION SWITCHING SIGNAL S | TRAIN CAR TRAVELING DIRECTION SIGNAL Rev |
|---|---|---|
| OPERATION CONTROL DEVICE 34a | FORWARD/BACKWARD | F/R |
| OPERATION CONTROL DEVICE 34b | FORWARD/BACKWARD | R/F |

ROTARY MACHINE CONTROL APPARATUS

FIELD

The present disclosure relates to a rotary machine control apparatus that obtains and controls rotor position information without using a position sensor that detects a rotor position.

BACKGROUND

In order to sufficiently bring out performance of a rotary machine in driving the rotary machine, position information on a rotor is necessary, Therefore, position information detected by a position sensor attached to a rotary machine has been used to drive the rotary machine. Meanwhile, in recent years, a technique of driving a rotary machine without a position sensor has been developed from the viewpoints of further reducing the manufacturing cost of the rotary machine, reducing the size of the rotary machine, and improving the reliability of the rotary machine.

In the control of a rotary machine using no position sensor, a method for estimating a rotor position of the rotary machine from an induced voltage of the rotary machine according to a speed region and a method for estimating a rotor position of the rotary machine by using saliency are used in combination or selectively used depending on the purpose. The former is used in a high-speed area in which an induced voltage necessary for position estimation can be sufficiently obtained, and the latter is used in a low-speed area in which a sufficient induced voltage cannot be obtained.

As a conventional technique of estimating a rotor position of a rotary machine by using saliency as in the latter method, for example, Patent Literature 1 below discloses a technique of estimating a rotor position of a rotary machine by applying, to the rotary machine, a high-frequency voltage having a frequency higher than a fundamental frequency.

A control system including this type of control apparatus can be roughly divided into a rotor position estimation system and a current control system. In the rotor position estimation system, an alternating-current component of a high-frequency current generated by application of a high-frequency voltage is calculated, and a rotor position is estimated from rotor position information included in the alternating-current component. For this rotor position estimation system, fundamental wave current for driving a rotary machine is a disturbance. Therefore, it is desirable to extract only the high-frequency current component by removing a fundamental wave current component from a detected current. For example, & band-pass filter or a high-pass filter is used to extract a high-frequency current component. These filters are designed such that a high-frequency current component can be extracted on the premise that the frequency of high-frequency voltage to be superimposed is widely different from a fundamental wave frequency for driving a rotary machine.

CITATION LIST

Patent Literature

Patent Literature 1: Japanese Patent Application Laid-open No. 2004-343833

SUMMARY OF INVENTION

Problem to be Solved by the Invention

The filters described above are generally installed on the premise that high-frequency current includes only the same frequency component as a superimposed frequency component. However, actual high-frequency current includes not only the same frequency component as the superimposed frequency component but also a sideband component of the superimposed frequency component. There are two sideband components. One is an upper sideband which is a sideband component to be generated on a side on which the absolute value of frequency is higher than the absolute value of superimposed frequency. The other is a lower sideband which is a sideband component to be generated on a side on which the absolute value of frequency is lower than the absolute value of superimposed frequency. These sideband components are affected by the speed of the rotary machine, and when the speed of the rotary machine increases, the two sideband components are distributed over a wide area, Therefore, there is a problem in that the sideband components adversely affect processing to be performed in the current control system and the rotor position estimation system.

For example, there is a problem in that when the lower sideband component of high-frequency current approaches a response frequency of the current control system due to an increase in the speed of a rotary machine and is distributed in the band of the current control system, the response of the current control system is deteriorated or becomes unstable.

Furthermore, when, for example, a high-pass filter is used to extract a high-frequency current, attenuation characteristics and phase characteristics differ between a frequency band lower than a cutoff frequency and a frequency band higher than the cutoff frequency. Therefore, there is a problem in that an S/N ratio in the rotor position estimation system varies between a case where the upper sideband is generated and a case where the lower sideband is generated. This problem is noticeable in applications in so-called four-quadrant driving, such as a driving device for a railroad car.

The present disclosure has been made in view of the above, and an object of the present disclosure is to provide a rotary machine control apparatus capable of preventing an adverse effect on a current control system and a rotor position estimation system, possibly caused by a sideband component of high-frequency current.

Means to Solve the Problem

In order to solve the above-described problems and achieve the object, a rotary machine control apparatus according to the present disclosure includes a current detection unit, a position estimation unit, a current control unit, a position estimation voltage generation unit, and a voltage application device. The current detection unit detects a rotary machine current flowing to a rotary machine. The position estimation unit calculates an estimate value of a rotor position based on the rotary machine current, the rotor position being position information on a rotor of the rotary machine. The current control unit generates a first voltage command based on a detection value of the rotary machine current and the estimate value of the rotor position, the first voltage command being a command value of rotary machine voltage for driving the rotary machine. The position estimation voltage generation unit generates a high-frequency voltage based on rotation information regarding direction of rotation of the rotor, the high-frequency voltage being a position estimation voltage for estimating the rotor position, the high-frequency voltage having a frequency higher than a frequency of the first voltage command. The voltage application device applies a driving voltage to the rotary machine based on a second voltage command, the second voltage command being a voltage command obtained by superimposition of the position estimation voltage on the first voltage command.

Effects of the Invention

The rotary machine control apparatus according to the present disclosure has the effect of preventing an adverse effect on a current control system and a rotor position estimation system, possibly caused by a sideband component of high-frequency current.

DESCRIPTION OF EMBODIMENTS

Hereinafter, rotary machine control apparatuses according to embodiments of the present disclosure will be described in detail with reference to the accompanying drawings.

First Embodiment

Figure 1:
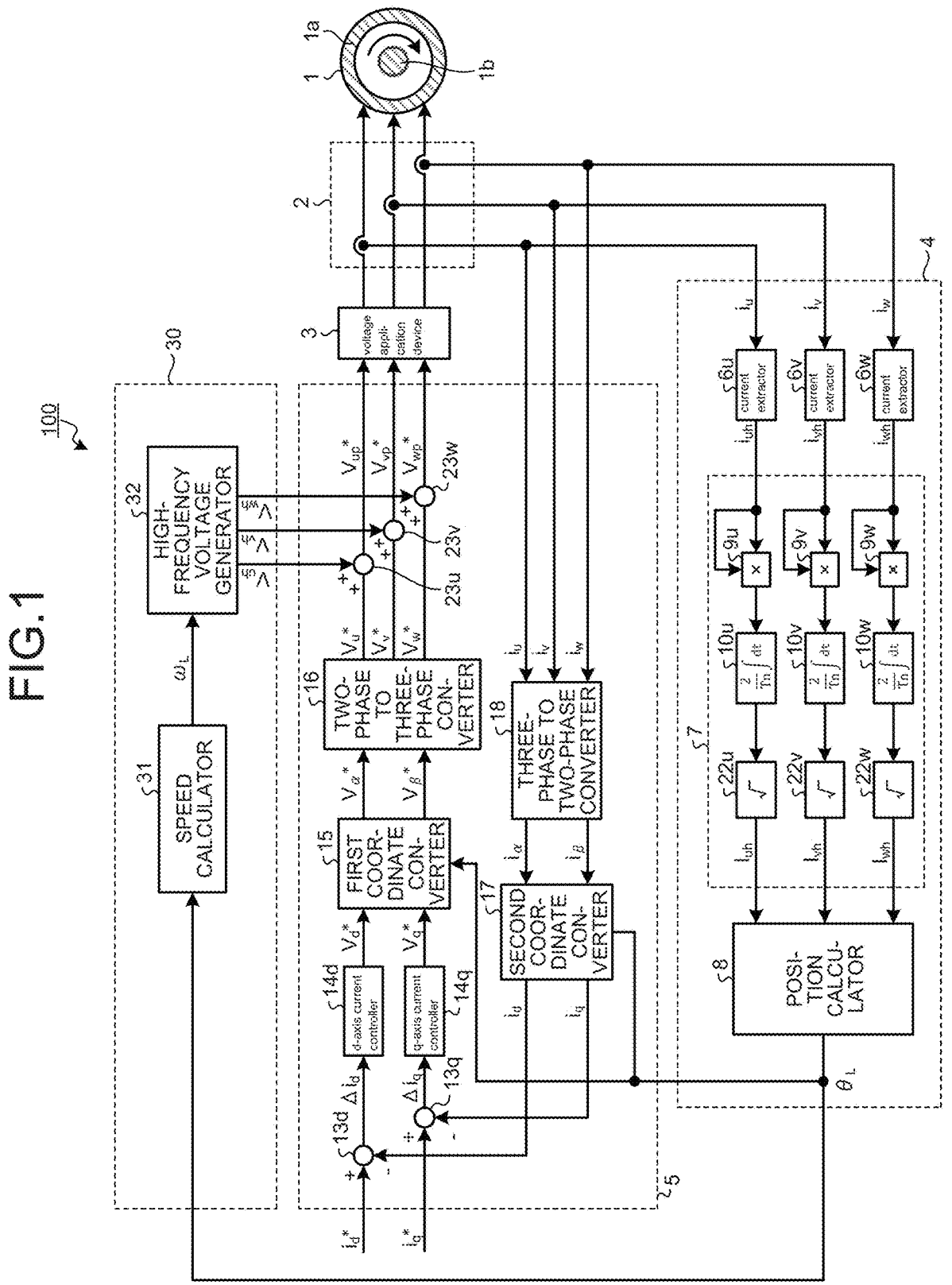
FIG. 1 is a diagram illustrating an exemplary configuration of a rotary machine control apparatus according to a first embodiment.

FIG. 1 is a diagram illustrating an exemplary configuration of a rotary machine control apparatus (hereinafter, appropriately abbreviated as "control apparatus") 100 according to a first embodiment. The control apparatus 100 according to the first embodiment includes a current detection unit 2, a voltage application device 3, a position estimation unit 4, a current control unit 5, and a position estimation voltage generation unit 30. In FIG. 1, the current control unit 5 is a controller of a current control system, and the position estimation unit 4 and the position estimation voltage generation unit 30 are controllers of a rotor position estimation system.

A rotary machine 1 is a device to be driven by the control apparatus 100. The rotary machine 1 includes a stator 1a and a rotor 1b disposed inside the stator 1a. In the present specification, an interior permanent magnet synchronous machine is cited as an example of the rotary machine 1. However, the rotary machine 1 of the present disclosure is not limited thereto. The rotary machine 1 may be a synchronous machine other than interior permanent magnet synchronous machines.

The current detection unit 2 detects rotary machine currents $i_u$, $i_v$, and $i_w$ flowing between the voltage application device 3 and the rotary machine 1. The rotary machine currents $i_u$, $i_v$, and $i_w$ are stator currents each flowing to corresponding one of the phases of the stator 1a, that is, stator currents flowing to the u-phase, v-phase, and w-phase of the stator 1a, respectively, A current detector is disposed in each phase of the current detection unit 2. An example of the current detector is a current transformer. Note that the current detection unit 2 detects all the three-phase currents in FIG. 1, but the configuration of the current detection unit 2 is not limited thereto. The current detection unit 2 may detect currents of any two of the three phases, and a current of the remaining one phase may be obtained by calculation by use of the fact that the rotary machine currents $i_u$, $i_v$, and $i_w$ are in three-phase equilibrium. Alternatively, instead of using the current detection unit 2 in FIG. 1, a bus current flowing through a direct-current bus (not illustrated), which is an electric wire for supplying direct-current power to the voltage application device 3, may be detected, and a rotary machine current may be obtained by calculation from the bus current.

The position estimation unit 4 calculates an estimate value $\theta_L$ of a rotor position, which is position information on the rotor 1b, based on the rotary machine currents $i_u$, $i_v$, and $i_w$. The current control unit 5 generates first voltage commands $V_u^*$, $V_v^*$, and $V_w^*$, which are command values of rotary machine voltage for driving the rotary machine 1, based on detection values of the rotary machine currents $i_u$, $i_v$, and $i_w$ and the estimate value $\theta_L$ of the rotor position. The position estimation voltage generation unit 30 generates high-frequency voltages $V_{uh}$, $V_{vh}$, and $V_{wh}$ having frequencies higher than frequencies of the first voltage commands $V_u^*$, $V_v^*$, and $V_w^*$, based on rotation information regarding the direction of rotation of the rotor 1b. The high-frequency voltages $V_{uh}$, $V_{vh}$, and $V_{wh}$ are position estimation voltages for estimating the rotor position. The current control unit 5 superimposes the high-frequency voltages $V_{uh}$, $V_{vh}$, and $V_{wh}$ on the first voltage commands $V_u^*$, $V_v^*$, and $V_w^*$, and outputs the superimposed voltages as second voltage commands $V_{up}^*$, $V_{vp}^*$, and $V_{wp}^*$ to the voltage application device 3. The voltage application device 3 applies a driving voltage to the rotary machine 1 based on the second voltage commands $V_{up}^*$, $V_{vp}^*$, and $V_{wp}^*$. Note that, in the present specification, a two-level three-phase inverter is cited as an example of the voltage application device 3, but the voltage application device 3 is not limited thereto. In the present specification, the voltage application device 3 may be a three-level three-phase inverter, or may be a multi-phase two-level or three-level inverter.

The current control unit 5 includes subtractors 13*d* and 13*q*, a d-axis current controller 14*d*, a q-axis current controller 14*g*, a first coordinate converter 15, a two-phase to three-phase converter 16, a second coordinate converter 17, a three-phase to two-phase converter 18, and adders 23*u*, 23*y*, and 23*w*.

The subtracter 13*d* calculates a deviation $\Delta i_d$ between a d-axis current command $i_d^*$ and a current $i_d$ output from the second coordinate converter 17. The d-axis current controller 14*d* provided at the next stage calculates a d-axis voltage command $V_d^*$ by performing proportional-integral control such that the deviation $\Delta i_d$ becomes zero. The subtracter 13*q* calculates a deviation $\Delta i_q$ between a q-axis current command $i_q^*$ and a current $i_q$ output from the second coordinate converter 17. The q-axis current controller 14*q* provided at the next stage calculates a q-axis voltage command $V_q^*$ by performing proportional-integral control such that the deviation $\Delta i_q$ becomes zero. The d-axis current command $i_d^*$ is a command value of d-axis current for driving the rotary machine 1, and the q-axis current command $i_q^*$ is a command value of q-axis current for driving the rotary machine 1. Both the d-axis current command $i_d^*$ and the q-axis current command $i_q^*$ are provided from the outside of the current control unit 5.

The first coordinate converter 15 converter the d-axis voltage command $V_d^*$ and the q-axis voltage command $V_q^*$ output from the d-axis current controller 14*d* and the g-axis current controller 14*q* into voltage commands $V_\alpha^*$ and $V_\beta^*$ on stationary biaxial coordinates, respectively. The two-phase to three-phase converter 16 converts the voltage commands $V_\alpha^*$ and $V_\beta^*$ output from the first coordinate converter 15 into the first voltage commands $V_u^*$, $V_v^*$, and $V_w^*$ which are driving voltage commands of three-phase alternating-current coordinates. Note that the estimate value $\theta_L$ of the rotor position output from the position estimation unit 4 is used by the first coordinate converter 15 to perform the processing.

The three-phase to two-phase converter 18 converts the rotary machine currents $i_u$, $i_v$, and $i_w$ detected by the current detection unit 2 into currents $i_\alpha$ and $i_\beta$ on the stationary biaxial coordinates. The second coordinate converter 17 converts the currents $i_\alpha$ and $i_\beta$ output from the three-phase to two-phase converter 18 into the currents $i_d$ and $i_q$ on the rotating coordinates that rotate in synchronization with the estimate value $\theta_L$ of the rotor position output from the position estimation unit 4, and outputs the currents $i_d$ and $i_q$ to the subtractors 13*d* and 13*q*, respectively.

The first voltage commands $V_u^*$, $V_v^*$, and $V_w^*$ output from the two-phase to three-phase converter 16 and the high-frequency voltages $V_{uh}$, $V_{vh}$, and $V_{wh}$ output from the position estimation voltage generation unit 30 are added together by the adders 23*u*, 23*v*, and 23*w*, respectively. Outputs of the adders 23*u*, 23*v*, and 23*w* are applied as the second voltage commands $V_{up}^*$, $V_{vp}^*$, and $V_{wp}^*$ to the voltage application device 3, respectively. Therefore, the second voltages commands $V_{up}^*$, $V_{vp}^*$, and $V_{wp}^*$ to be applied to the voltage application device 3 include the first voltage commands $V_u^*$, $V_v^*$, and $V_w^*$ and the high-frequency voltages $V_{uh}$, $V_{vh}$, and $V_{wh}$ which are position estimation voltage commands superimposed on the first voltage commands $V_u^*$, $V_v^*$, and $V_w^*$, respectively. Note that details of the high-frequency voltages $V_{uh}$, $V_{vh}$, and $V_{wh}$ will be described below.

The position estimation unit 4 includes current extractors 6*u*, 6*v*, and 6*w*, a high-frequency current amplitude calculation unit 7, and a position calculator 8. As described above, the second voltage commands $V_{up}^*$, $V_{vp}^*$, and $V_{wp}^*$ to be applied to the voltage application device 3 include the first voltage commands $V_u^*$, $V_v^*$, and $V_w^*$ output from the two-phase to three-phase converter 16 and the high-frequency voltages $V_{uh}$, $V_{vh}$, and $V_{wh}$ output from the position estimation voltage generation unit 30 and superimposed on the first voltage commands $V_u^*$, $V_v^*$, and $V_w^*$, respectively. As a result, the rotary machine currents $i_u$, $i_v$, and $i_v$ detected by the current detection unit 2 include high-frequency currents $i_{uh}$, $i_{vh}$, and $i_{wh}$ having the game frequency components as frequency components of the high-frequency voltages $V_{uh}$, $V_{vh}$, and $V_{wh}$, respectively.

Therefore, the current extractors 6*u*, 6*v*, and 6*w* extract the high-frequency currents $i_{uh}$, $i_{vh}$, and $i_{wh}$ having the same frequency components as the frequency components of the high-frequency voltages $V_{uh}$, $V_{vh}$, and $V_{wh}$ from the rotary machine currents $i_u$, $i_v$, and $i_w$ detected by the current detection unit 2, respectively. A band-pass filter or a notch filter can be used to extract the high-frequency currents $i_{uh}$, $i_{vh}$, and $i_{wh}$. Note that when a notch filter is used, the rotary machine currents $i_u$, $i_v$, and $i_w$ are input to the notch filter to attenuate the same frequency components as the frequency components of the high-frequency voltages $V_{uh}$, $V_{vh}$, and $V_{wh}$, respectively. Then, the respective currents having passed through the notch filter are subtracted from the rotary machine currents $i_u$, $i_v$, and $i_w$. Thus, the high-frequency currents $i_{uh}$, $i_{vh}$, and $i_{wh}$ can be extracted.

The high-frequency current amplitude calculation unit 7 includes multipliers 9*u*, 9*v*, and 9*w*, integrators 10*u*, 10*v*, and 10*w*, and square root calculators 22*u*, 22*v*, and 22*w*. These constituent parts are each provided for a corresponding phase.

In the multipliers 9*u*, 9*v*, and 9*w*, the high-frequency currents $i_{uh}$, $i_{vh}$, and $i_{wh}$ are squared to obtain autocorrelation values, respectively. In the integrators 10*u*, 10*v*, and 10*w*, integration processing is performed with respect to time Th corresponding to one integration cycle, and an obtained value of integral is multiplied by (2/Tn) and output. The square root calculators 22*u*, 22*v*, and 22*w* calculate the square root of outputs of the integrators 10*u*, 10*v*, and 10*w* to obtain position estimation current amplitudes $I_{uh}$, $I_{vh}$, and $I_{wh}$ respectively.

Note that the high-frequency current amplitude calculation unit 7 in FIG. 1 obtains the position estimation current amplitudes $I_{uh}$, $I_{vh}$, and $I_{wh}$ by integrating the autocorrelation values of the high-frequency currents $i_{uh}$, $i_{vh}$, and $i_{wh}$ respectively, and calculating the square roots thereof, but the way of obtaining the position estimation current amplitudes $I_{uh}$, $I_{vh}$, and $I_{wh}$ is not limited thereto. The high-frequency current amplitude calculation unit 7 may obtain the position estimation current amplitudes $I_{uh}$, $I_{vh}$, and $I_{wh}$ by passing the autocorrelation values of the high-frequency currents $i_{uh}$, $i_{vh}$, and $i_{wh}$ through a low-pass filter, respectively.

The position calculator 8 calculates the estimate value $\theta_L$ of the rotor position based on the position estimation current amplitudes $I_{uh}$, $I_{vh}$, and $I_{wh}$ calculated by the high-frequency current amplitude calculation unit 7. A known method is used to calculate the estimate value $\theta_L$ of the rotor position. Thus, a detailed description of calculation of the estimate value $\theta_L$ will be omitted here. Note that for more details, refer to, for example, Japanese Patent No. 5324646 that discloses a specific calculation procedure.

Figure 2:
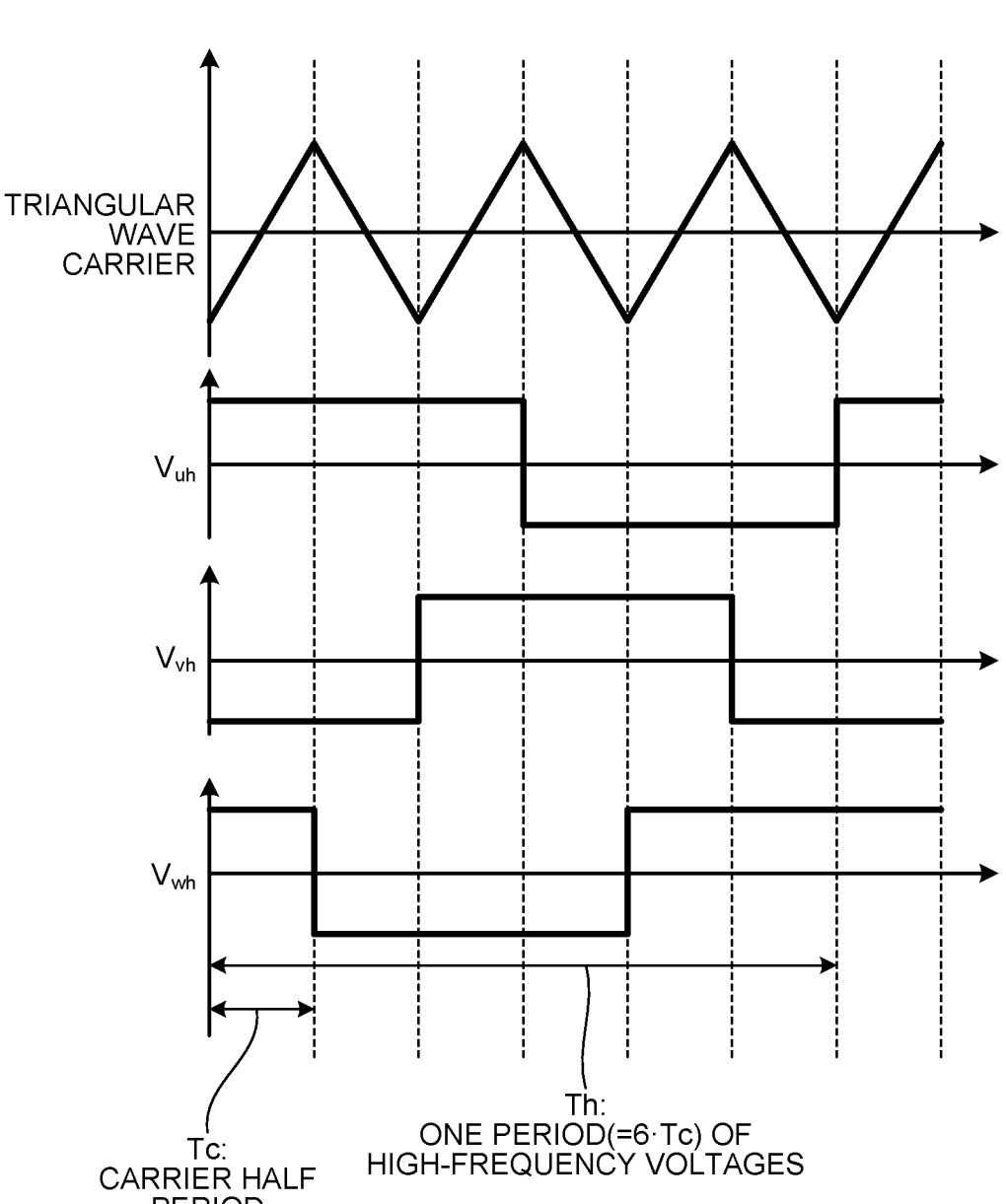
FIG. 2 is a diagram illustrating an example of waveforms of high-frequency voltages to be output from a position estimation voltage generation unit in FIG. 1.

Next, the high-frequency voltages $V_{uh}$, $V_{vh}$, and $V_{wh}$ to be output from the position estimation voltage generation unit 30 will be described. FIG. 2 is a diagram illustrating an example of waveforms of the high-frequency voltages $V_{uh}$, $V_{vh}$, and $V_{wh}$ to be output from the position estimation voltage generation unit 30 in FIG. 1. Note that FIG. 2 shows an example of waveforms to be observed when the voltage application device 3 includes a pulse width modulation (PWM) inverter for triangular wave comparison.

The horizontal axis represents time in FIG. 2. In addition, FIG. 2 illustrates waveforms of a triangular wave carrier, the u-phase high-frequency voltage $V_{uh}$, the v-phase high-frequency voltage $V_{vh}$, and the w-phase high-frequency voltage $V_{wh}$ in order from the top. Assuming that a half period Tc of the triangular wave carrier is defined as one section, each of the high-frequency voltages $V_{uh}$, $V_{vh}$, and $V_{wh}$ is a signal having a period of Th corresponding to six sections (=6·Tc). In the example of FIG. 2, the high-frequency voltages $V_{uh}$, $V_{vh}$, and $V_{wh}$ have been set such that the high-frequency voltages $V_{uh}$, $V_{vh}$, and $V_{wh}$ are out of phase with each other by two sections (=2·Tc) so as to achieve three-phase equilibrium. Note that FIG. 2 merely shows an example, and the waveforms of the high-frequency voltages $V_{uh}$, $V_{vh}$, and $V_{wh}$ are not limited to the waveforms of this example. Any waveforms may be acceptable as long as the waveforms allow the high-frequency voltages $V_{uh}$, $V_{vh}$, and $V_{wh}$ to be in three-phase equilibrium.

Returning to FIG. 1, the position estimation voltage generation unit 30 will be described. The position estimation voltage generation unit 30 includes a speed calculator 31 and a high-frequency voltage generator 32. The speed calculator 31 calculates an estimated rotational speed $\omega_L$ based on the estimate value $\theta_L$ of the rotor position. The estimated rotational speed $\omega_L$ is an estimate value of rotational speed of the rotor 1b. The estimated rotational speed $\omega_L$ is obtained by differential processing or pseudo differential processing of the estimate value $\theta_L$ of the rotor position. Note that the pseudo differential processing mentioned herein can be implemented by use of a differentiator and a low-pass filter.

Figure 3:
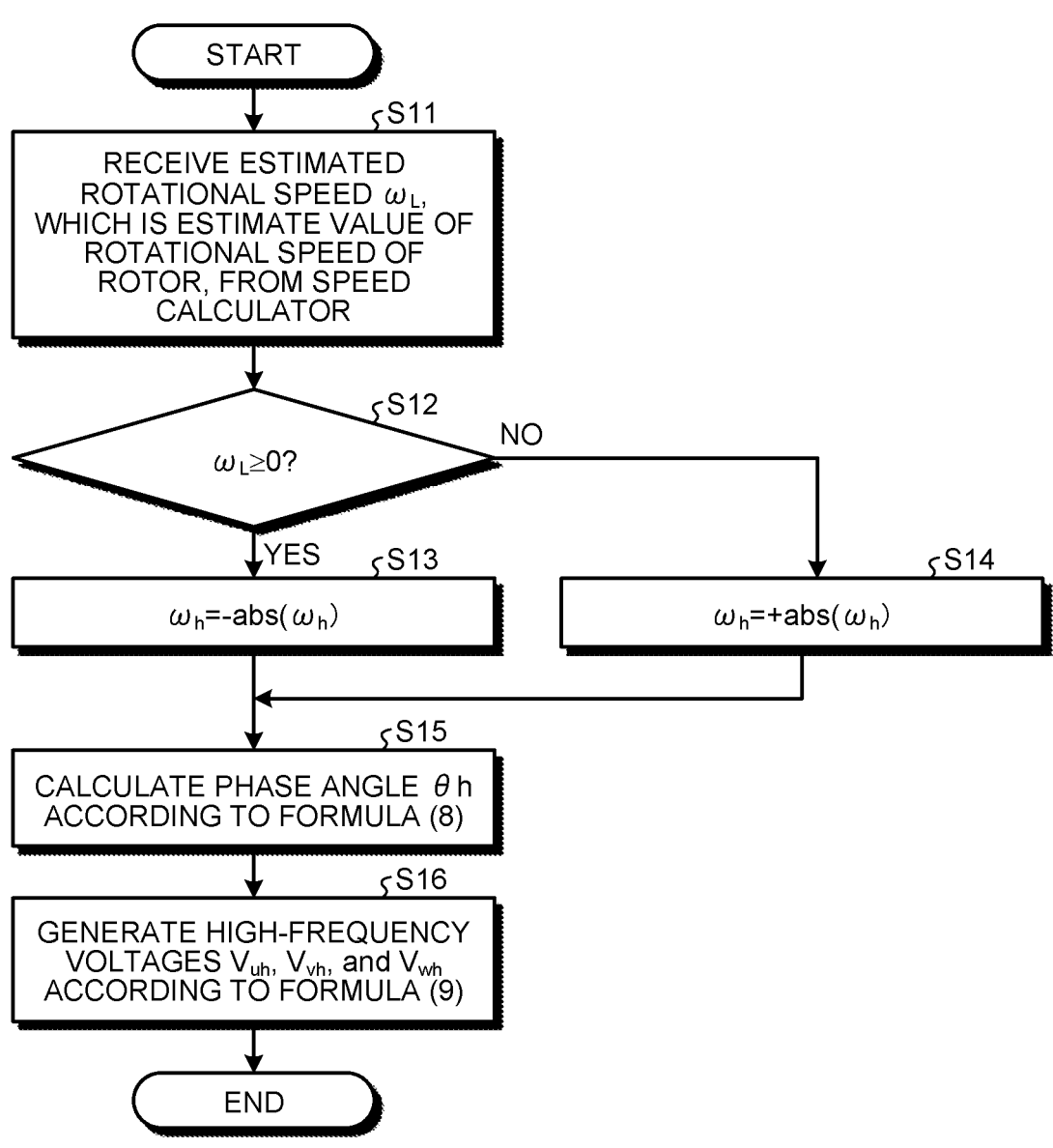
FIG. 3 is a flowchart for describing operation of a high-frequency voltage generator illustrated in FIG. 1.

The high-frequency voltage generator 32 generates the high-frequency voltages $V_{uh}$, $V_{vh}$, and $V_{wh}$ described above, based on the estimated rotational speed $\omega_L$. Operation of the high-frequency voltage generator 32 will be described with reference to several formulas and a flowchart illustrated in FIG. 3. FIG. 3 is a flowchart for describing operation of the high-frequency voltage generator 32 illustrated in FIG. 1.

In describing the operation of the high-frequency voltage generator 32, a formula representing high-frequency current is derived. First, a voltage equation of the rotary machine 1 on an α-axis and a β-axis in a coordinate system at rest is expressed by formula (1) below. Note that the following assumes that the rotary machine 1 is an interior permanent magnet synchronous machine.

Formula 1

$$\begin{bmatrix} V_\alpha \\ V_\beta \end{bmatrix} = \begin{bmatrix} R + pL_\alpha & pL_{\alpha\beta} \\ pL_{\alpha\beta} & R + pL_\beta \end{bmatrix} \begin{bmatrix} i_\alpha \\ i_\beta \end{bmatrix} + \omega K_E - \begin{bmatrix} -\sin\theta \\ \cos\theta \end{bmatrix} \qquad (1)$$

$$L_\alpha = L_0 + L_1 \cos(2\theta)$$
$$L_\beta = L_0 - L_1 \cos(2\theta)$$
$$L_{\alpha\beta} = L_1 \sin(2\theta)$$
$$L_0 = \frac{L_d + L_q}{2}$$
$$L_1 = \frac{L_d - L_q}{2}$$

In formula (1) above, $V_\alpha$, $V_\beta$, $i_\alpha$, and $i_\beta$ denote α-axis voltage, β-axis voltage, α-axis current, and β-axis current, respectively. Furthermore, R and Kr denote stator resistance and an induced voltage coefficient, respectively. In addition, $L_\alpha$, $L_\beta$, $L_{\alpha\beta}$, $L_d$, and $L_q$ denote α-axis inductance, β-axis inductance, mutual inductance between the α-axis and the β-axis, d-axis inductance, and q-axis inductance, respectively. Moreover, $L_0$ is defined by a fifth equation of formula (1) above, and $L_1$ is defined by a sixth equation of formula (1) above. In addition, p denotes a differential operator.

Considering only high-frequency components in formula (1) above, formula (2) below is obtained.

Formula 2

$$\begin{bmatrix} V_{\alpha h} \\ V_{\beta h} \end{bmatrix} = p \begin{bmatrix} L_\alpha & L_{\alpha\beta} \\ L_{\alpha\beta} & L_\beta \end{bmatrix} \begin{bmatrix} i_{\alpha h} \\ i_{\beta h} \end{bmatrix} \qquad (2)$$

In formula (2) above, $V_{\alpha h}$, $V_{\beta h}$, $i_{\alpha h}$, and $i_{\beta h}$ denote high-frequency components of the α-axis voltage, the β-axis voltage, the α-axis current, and the β-axis current, respectively. Note that regarding transformation from formula (1) above to formula (2) above, a similar formula can also be obtained for a synchronous reluctance motor that uses no magnet. Therefore, it is needless to say that formula (2) above is not limited to an interior permanent magnet synchronous machine.

When formula (2) above is solved for a current derivative term, formula (3) below is obtained.

Formula 3

$$p \begin{bmatrix} i_{\alpha h} \\ i_{\beta h} \end{bmatrix} = \frac{1}{L_0^2 - L_1^2} \left\{ L_0 I - L_1 \begin{bmatrix} \cos(2\theta) & \sin(2\theta) \\ \sin(2\theta) & -\cos(2\theta) \end{bmatrix} \right\} \begin{bmatrix} V_{\alpha h} \\ V_{\beta h} \end{bmatrix} \qquad (3)$$

In addition, the high-frequency voltages $V_\alpha$ and $V_\beta$ on the α-axis and the β-axis, respectively, are defined by formula (4) below.

Formula 4

$$\begin{bmatrix} V_{\alpha h} \\ V_{\beta h} \end{bmatrix} = V_{h\alpha\beta} \begin{bmatrix} \cos(\omega_h t) \\ \sin(\omega_h t) \end{bmatrix} \qquad (4)$$

In formula (4) above, $V_{h\alpha\beta}$ denotes high-frequency voltage amplitude on the α-axis and the β-axis, and $\omega_h$ denotes angular frequency on the α-axis and the β-axis. Note that the angular frequency is also called "angular speed".

Here, the high-frequency voltages $V_\alpha$ and $V_\beta$ are vectors, and rotational direction changes depending on whether the angular frequency $\omega_h$ is a positive value or a negative value. That is, the rotational direction is reversed when the angular frequency $\omega_h$ changes from a negative value to a positive value, and vice versa. Here, rotational direction is defined as "reverse rotation" when the angular frequency $\omega_h$ is a negative value, and rotational direction is defined as "forward rotation" when the angular frequency $\omega_h$ is a positive value.

When formula (4) above is expressed on three-phase coordinates, formula (5) below is obtained.

Formula 5

$$\begin{bmatrix} V_{uh} \\ V_{vh} \\ V_{wh} \end{bmatrix} = V_{havw} \begin{bmatrix} \sin(\omega_h t) \\ \sin(\omega_h t - 2\pi/3) \\ \sin(\omega_h t + 2\pi/3) \end{bmatrix} \qquad (5)$$

In formula (5) above, $V_{huvw}$ denotes high-frequency voltage amplitude on the three-phase coordinates. Note that the relationship between the rotational direction of the high-frequency voltages $V_{uh}$, $V_{vh}$, and $V_{wh}$ on the three-phase coordinates and the sign (positive or negative) of the angular frequency $\omega_h$ is the same as the relationship with the high-frequency voltage $V_\alpha$ on the α-axis and the high-frequency voltage $V_\beta$ on the β-axis.

When formula (4) above is substituted into formula (3) above, formula (6) below is obtained.

Formula 6

$$p\begin{bmatrix} i_{\alpha h} \\ i_{\beta h} \end{bmatrix} = \frac{V_h}{L_0^2 - L_1^2}\left\{ L_0 \begin{bmatrix} \cos(\omega_h t) \\ \sin(\omega_h t) \end{bmatrix} - L_1 \begin{bmatrix} \cos(\omega_h t - 2\theta) \\ -\sin(\omega_h t - 2\theta) \end{bmatrix} \right\} \quad (6)$$

Assuming that the rotary machine 1 is not in operation, formula (7) below is obtained by integration of formula (6) above.

Formula 7

$$\begin{bmatrix} i_{\alpha h} \\ i_{\beta h} \end{bmatrix} = \frac{V_h}{\omega_h(L_0^2 - L_1^2)}\left\{ L_0 \begin{bmatrix} \sin(\omega_h t) \\ -\cos(\omega_h t) \end{bmatrix} - L_1 \begin{bmatrix} \sin(\omega_h t - 2\theta) \\ -\cos(\omega_h t - 2\theta) \end{bmatrix} \right\} \quad (7)$$
$$= \frac{V_h}{\omega_h(L_0^2 - L_1^2)}\left\{ L_0 \begin{bmatrix} \sin(\omega_h t) \\ -\cos(\omega_h t) \end{bmatrix} - L_1 \begin{bmatrix} \sin\{(\omega_h t - 2\omega)t\} \\ -\cos\{(\omega_t t - 2\omega)t\} \end{bmatrix} \right\}$$

In formula (7) above, w denotes the angular frequency of the rotary machine 1. The angular frequency of the rotary machine 1 is synonymous with the rotational speed of the rotary machine 1. As with the high-frequency voltages $V_{uh}$, $V_{vh}$, and $V_{wh}$, rotational direction is defined as "reverse rotation" when the angular frequency w of the rotary machine 1 is a negative value, and rotational direction is defined as "forward rotation" when the angular frequency ω is a positive value.

As shown in a second equation of formula (7) above, the high-frequency currents $i_\alpha$, and $i_\beta$ include a term including only the angular frequency $\omega_h$ and a term including both the angular frequencies $\omega_h$ and ω. The former is a term including only a superimposed frequency component for rotor position estimation, and the latter is a term including the above-described sideband component.

Here, as described above, a sideband component to be generated on a side on which the absolute value of frequency is higher than the absolute value of superimposed frequency is referred to as an "upper sideband", and a sideband component to be generated on a side on which the absolute value of frequency is lower than the absolute value of superimposed frequency is referred to as a "lower sideband". As can be understood from the second equation of formula (7) above, when the angular frequency ω of the rotary machine 1 and the angular frequency $\omega_h$ of the high-frequency voltages $V_{uh}$, $V_{vh}$, and $V_{wh}$ have the same sign, a component "$\omega_h - 2\omega$" corresponds to a lower sideband. Meanwhile, when the angular frequency ω of the rotary machine 1 and the angular frequency $\omega_h$ of the high-frequency voltages $V_{uh}$, $V_{vh}$, and $V_{wh}$ have different aligns, the component "$\omega_h - 2\omega$" corresponds to an upper sideband.

As described above, the sideband component adversely affects processing to be performed in the current control system and the rotor position estimation system. This will be described in more detail here.

First, a description will be given of the influence of the sideband distribution of high-frequency current on the current control system. High-frequency current including a superimposed frequency component and a sideband component is a disturbance for the current control system. Therefore, it is desirable that the frequency of high-frequency current be widely different from the response frequency of the current control system. However, when the number of revolutions of the rotary machine increases, the sideband component is distributed over a wide area. In particular, under conditions where a lower sideband is generated, a lower sideband component is distributed in a current control band. This causes adverse effects on the current control system, such as deterioration and instability of response. Meanwhile, under conditions where an upper sideband is generated, the upper sideband is generated in a direction away from the current control band, that is, outside the current control band, so that the above-described adverse effects are not exerted on the current control system. Therefore, a condition that an upper sideband is constantly generated is a desirable condition for the current control system.

Next, a description will be given of the influence of the sideband distribution of high-frequency current on the rotor position estimation system. The sideband component of high-frequency current includes rotor position information. Therefore, when the sideband component of the high-frequency current is reduced by the current control system, an S/N ratio deteriorates, so that the estimate value of the rotor position vibrates and becomes unstable. This problem occurs due to distribution of a lower sideband in the current control band when speed increases in a case where the sideband component of high-frequency current is the lower sideband. Meanwhile, under conditions where an upper sideband is generated, the upper sideband is generated in a direction away from the current control band, that is, outside the current control band, so that the above-described adverse effects are not exerted on the current control system.

Furthermore, a case is considered in which a filter having different attenuation characteristics and phase characteristics between frequency lower than a cutoff frequency and frequency higher than the cutoff frequency, such as a BPF or HPF, is used for extracting high-frequency current. When such a filter is used, there is a difference between position estimation characteristics under conditions where an upper sideband is generated and those under conditions where a lower sideband is generated. For example, in a case where a filter that attenuates a low frequency component, such as the HPF, is used under conditions where a lower sideband is generated, the S/N ratio deteriorates due to attenuation of the lower sideband including position information. In addition, since phase characteristics differ between frequency lower than the cutoff frequency and frequency higher than the cutoff frequency, there is a difference between position estimation response under conditions where an upper sideband is generated and that under conditions where a lower sideband is generated. Therefore, a condition that an upper sideband is constantly generated is a desirable condition for the rotor position estimation system.

As described above, the high-frequency voltage generator 32 generates the high-frequency voltages $V_{uh}$, $V_{vh}$, and $V_{wh}$ that allow an upper sideband to be constantly generated. Specifically, operation is performed according to the flow-chart of FIG. 3.

The high-frequency voltage generator 32 receives the estimated rotational speed $\omega_L$, which is an estimate value of the rotational speed of the rotor 1$b$, from the speed calculator 31 (step S11), The high-frequency voltage generator 32 checks the sign of the value of the estimated rotational speed $\omega_L$. Specifically, the high-frequency voltage generator 32 checks whether the value of the estimated rotational speed

11

$\omega_L$ is equal to or greater than zero (step S12). When the value of the estimated rotational speed $\omega_L$ is equal to or greater than zero (step S12, Yes), the value of the angular frequency $\omega_h$ is inverted. Specifically, the absolute value of the angular frequency $\omega_h$ is multiplied by "−1", and an obtained value is set as the angular frequency $\omega_h$ (step S13). Furthermore, when the value of the estimated rotational speed $\omega_L$ is less than zero (step S12, No), the absolute value of the angular frequency $\omega_h$ is set as the angular frequency $\omega_h$ (step S14).

The high-frequency voltage generator 32 calculates a phase angle $\theta_h$ according to formula (8) below by using the angular frequency $\omega_h$ set in step S13 or step S14 (step S15), Formula 8

$$\theta_h = \int \omega_h \, dt \qquad (8)$$

In addition, the high-frequency voltage generator 32 generates the high-frequency voltages $V_{uh}$, $V_{vh}$, and $V_{wh}$ according to formula (9) below by using the phase angle $\theta_h$ calculated in step S15 (step S16).

Formula 9

$$\begin{bmatrix} V_{ah} \\ V_{vh} \\ V_{wh} \end{bmatrix} = V_{havw} \begin{bmatrix} \sin(\theta_h) \\ \sin(\theta_h - 2\pi/3) \\ \sin(\theta_h + 2\pi/3) \end{bmatrix} \qquad (9)$$

As a result of the above processing, the high-frequency voltages $V_{uh}$, $V_{vh}$, and $V_{wh}$ are generated which allow an upper sideband to be constantly generated.

Note that, in steps S13 and S14, the sign of the angular frequency $\omega_h$ is changed depending on the sign of the estimated rotational speed $\omega_L$, but this method is not a limitation. The phase sequence of any two phases in formula (9) above may be changed without a change of the sign of the angular frequency $\omega_h$. In this way, the rotational direction of the high-frequency voltages $V_{uh}$, $V_{vh}$, and $V_{wh}$ can be changed.

Furthermore, in the first embodiment, the speed calculator 31 calculates the estimated rotational speed $\omega_L$ based on the estimate value $\theta_L$ of the rotor position. However, the speed calculator 31 does not necessarily need to calculate the estimated rotational speed $\omega_L$. The speed calculator 31 may detect the direction of rotation of the rotor 1b and output detection information to the high-frequency voltage generator.

As described above, according to the rotary machine control apparatus of the first embodiment, the current control unit generates a first voltage command that is a command value of rotary machine voltage for driving a rotary machine, based on a detection value of rotary machine current and an estimate value of a rotor position. Then, the position estimation voltage generation unit generates a high-frequency voltage based on rotation information regarding the direction of rotation of the rotor, the high-frequency voltage being a position estimation voltage for estimating the rotor position, the high-frequency voltage having a frequency higher than a frequency of the first voltage command. As a result, it is possible to prevent an adverse effect on a current control system and a rotor position estimation system, possibly caused by a sideband component of high-frequency current.

Note that, in the rotary machine control apparatus according to the first embodiment, the position estimation voltage generation unit may include a speed calculator that calculates, as speed information on the rotor, an estimate value of rotational speed based on the estimate value of the rotor position. According to this configuration, it is possible to generate position estimation voltage by using, as the rotation information, the estimate value of rotational speed calculated by the speed calculator.

In addition, according to the rotary machine control apparatus of the first embodiment, the position estimation voltage generation unit operates in such a way as to generate high-frequency voltage that allows an upper sideband to be constantly generated. The upper sideband is generated in a direction away from the current control band, that is, outside the current control band, so that it is possible to prevent adverse effects on the current control system, such as deterioration or instability of response. In addition, since the high-frequency voltage generated by the position estimation voltage generation unit prevents generation of a lower sideband, it is possible to prevent a decrease in the S/N ratio in filter characteristics of a filter to be used to extract the high-frequency current. This makes it possible to stabilize response characteristics in the rotor position estimation system.

Second Embodiment

Figure 4:
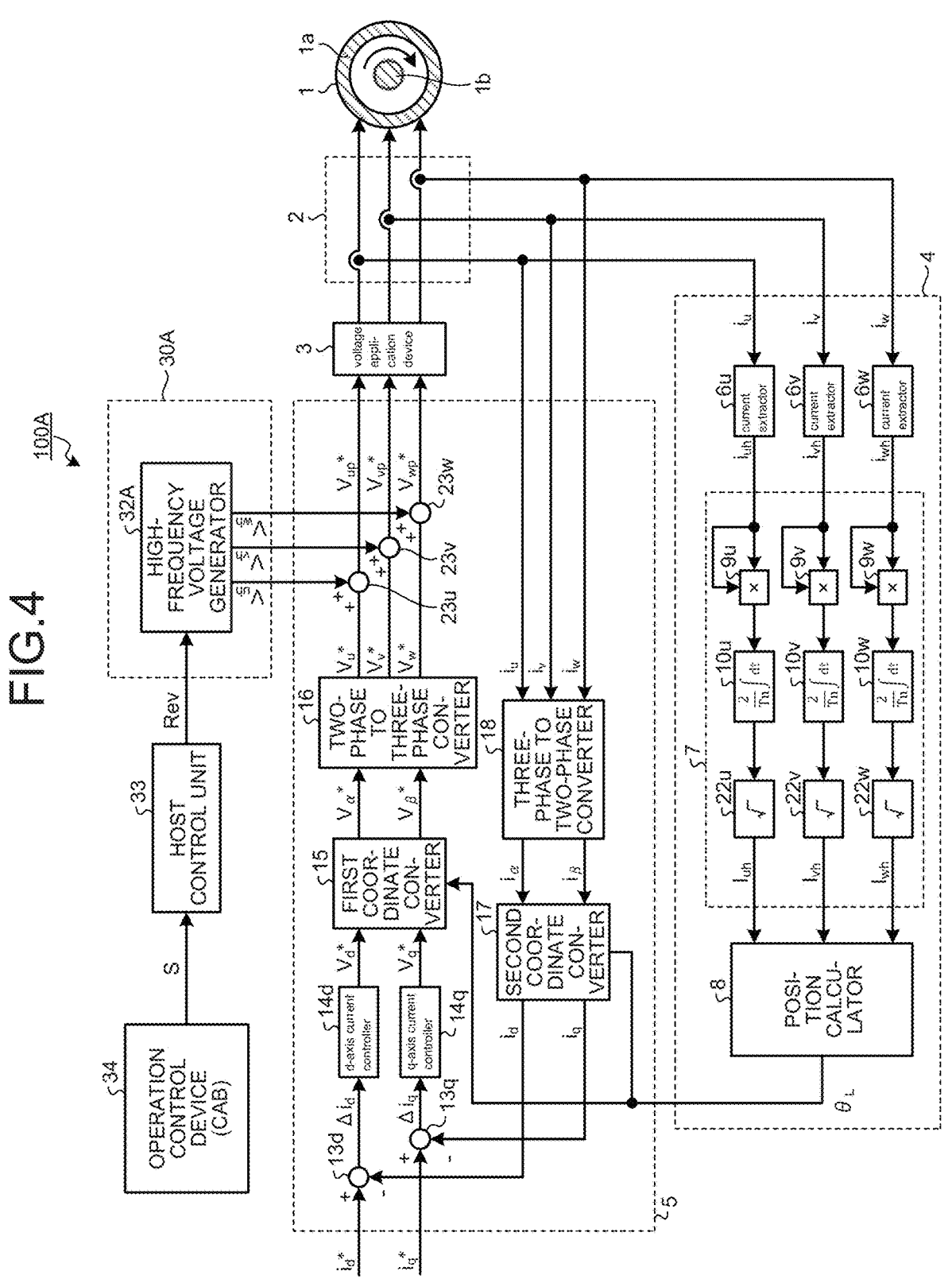
FIG. 4 is a diagram illustrating an exemplary configuration of a rotary machine control apparatus according to a second embodiment.

FIG. 4 is a diagram illustrating an exemplary configuration of a rotary machine control apparatus 100A according to a second embodiment. Comparing the control apparatus 100A according to the second embodiment with the control apparatus 100 illustrated in FIG. 1, the position estimation voltage generation unit 30 has been replaced with a position estimation voltage generation unit 30A in FIG. 4. In addition, the high-frequency voltage generator 32 illustrated in FIG. 1 has been replaced with a high-frequency voltage generator 32A in the position estimation voltage generation unit 30A. Furthermore, FIG. 4 illustrates a host control unit 33 and an operation control device 34 as components provided outside the control apparatus 100A. Except for these points, the configuration of the control apparatus 100A is the same as or equivalent to the configuration of the control apparatus 100. Thus, the same or equivalent constituent parts are designated by the same reference numerals, and redundant description will be omitted.

Figures 5, 6:
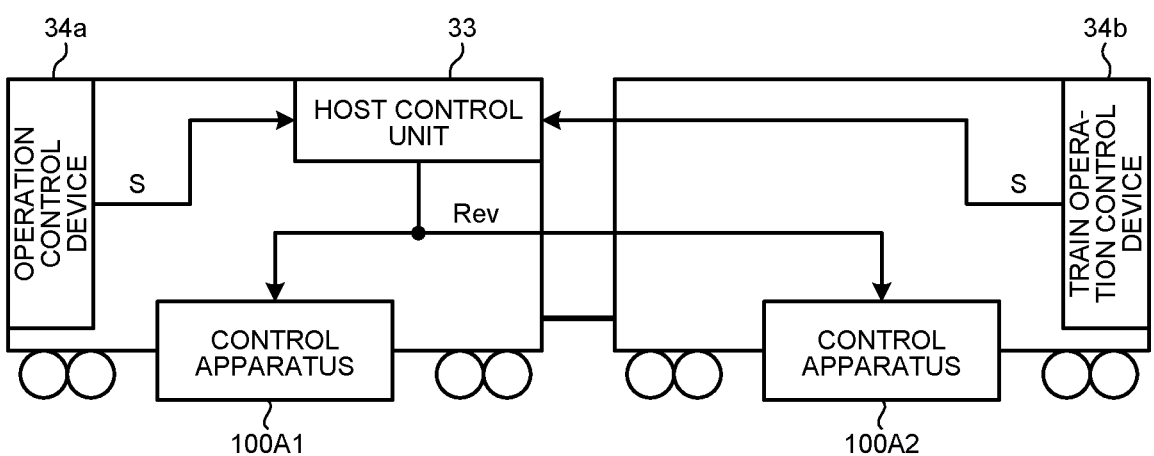
FIG. 5 is a diagram illustrating an exemplary configuration in which the control apparatus having the configuration illustrated in FIG. 4 is installed on a railroad car.
FIG. 6 is a table illustrating details of internal processing to be performed in a host control unit illustrated in FIG. 4.

FIG. 5 is a diagram illustrating an exemplary configuration in which the control apparatus 100A having the configuration illustrated in FIG. 4 is installed on a railroad car. As illustrated in FIG. 5, the control apparatus 100A according to the second embodiment is configured on the assumption that the control apparatus 100A is to be installed on a railroad car. Note that although FIG. 5 shows an example of a two-car train, the number of cars is not limited to two, and the control apparatus 100A may be installed on a single-car train or a train with three or more cars. For example, in the case of a two-car train, two operation control devices 34, a single host control unit 33, and two control apparatuses 100A are provided as illustrated in FIG. 5.

The two operation control devices 34 (34a, 34b) are installed as illustrated in FIG. 5. In this configuration, a train car direction switching signal S is output from one of the devices, and the train car direction switching signal S is transmitted to the host control unit 33. The train car direction switching signal S is a signal to be output when the traveling direction of the train is switched. The host control unit 33 can recognize whether the traveling direction of the train is "forward" or "backward" by receiving this signal.

As described above, the train car direction switching signal S is a signal for determining whether to cause the train cars to move "forward" or "backward". In practice, a train driver who gets on either of the train cars performs a required operation as to whether the train travels as an up train or a down train (upbound or downbound) on a route. As a result of this operation, the train car direction switching signal $ of moving "forward" or "backward" is output to the host control unit 33.

When receiving the transmitted train car direction switching signal S, the host control unit 33 converts the train car direction switching signal 8 into a train car traveling direction signal Rev, and transmits the train car traveling direction signal Rev to two control apparatuses 100A1 and 100A2 in the train cars. Then, the host control unit 33 causes the control apparatuses 100A1 and 100A2 to recognize whether the train is moving "forward" or "backward".

FIG. 6 is a table illustrating details of internal processing to be performed in the host control unit 33 illustrated in FIG. 4. More specifically, when the operation control device 34a in FIG. 5 outputs a signal of moving "forward" as the train car direction switching signal 8, the host control unit 33 outputs a signal "F" (forward) as the train car traveling direction signal Rev to the control apparatuses 100A1 and 100A2, and when the operation control device 34a outputs a signal of moving "backward" as the train car direction switching signal S, the host control unit 33 outputs a signal "R" (reverse) as the train car traveling direction signal Rev to the control apparatuses 100A1 and 100A2.

Meanwhile, when train car direction switching signal S is output from the operation control device 34b, the above relationship is reversed. That is, when the operation control device 34b outputs a signal of moving "forward" as the train car direction switching signal S, the host control unit 33 outputs a signal "R" as the train car traveling direction signal Rev to the control apparatuses 100A1 and 100A2, and when the operation control device 34b outputs a signal of moving "backward" as the train car direction switching signal S, the host control unit 33 outputs a signal "F" as the train car traveling direction signal Rev to the control apparatuses 100A1 and 100A2.

Returning to description of FIG. 4, the host control unit 33 receives the train car direction switching signal 8 from the operation control device 34. The host control unit 33 outputs the train car traveling direction signal Rev to the high-frequency voltage generator 32A based on the train car direction switching signal 8. The high-frequency voltage generator 32A uses the train car traveling direction signal Rev as rotation information. Then, the high-frequency voltage generator 32A generates the high-frequency voltages $V_{uh}$, $V_{vh}$, and $V_{wh}$ by using the method of the first embodiment. As a result, the high-frequency voltage generator 32A can generate the high-frequency voltages $V_{uh}$, $V_{vh}$, and $V_{wh}$ that allow an upper sideband to be constantly generated.

Figure 7:
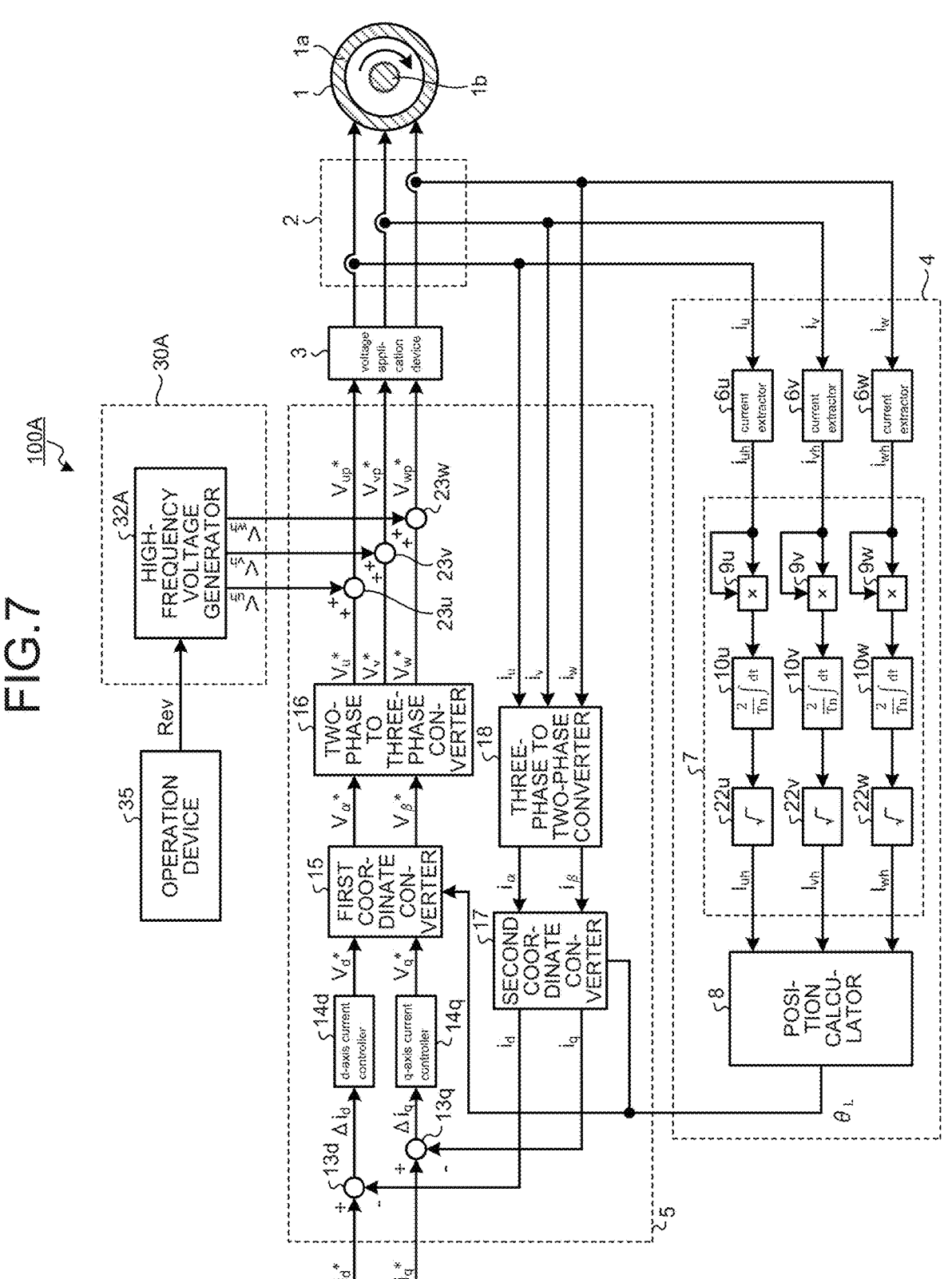
FIG. 7 is a diagram illustrating another exemplary configuration of the rotary machine control apparatus according to the second embodiment.
Figure 8:
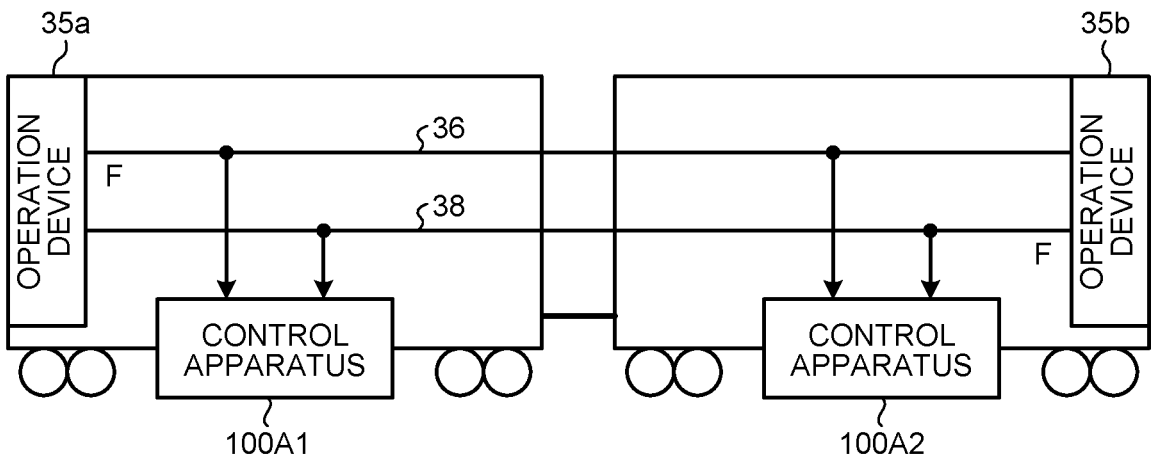
FIG. 8 is a diagram illustrating an exemplary configuration in which the control apparatus having the configuration illustrated in FIG. 7 is installed on a railroad car.

Note that although FIGS. 4 and 5 show an example in which the train car traveling direction signal Rev generated based on the train car direction switching signal S is transmitted from the host control unit 33 to the two control apparatuses 100A1 and 100A2 in the train cars, the configuration of the control apparatus 100A according to the second embodiment is not limited to this example. The rotary machine control apparatus 100A according to the second embodiment may be configured as illustrated in FIGS. 7 and 8. FIG. 7 is a diagram illustrating another exemplary configuration of the rotary machine control apparatus 100A according to the second embodiment. Furthermore, FIG. 8 is a diagram illustrating an exemplary configuration in which the control apparatus 100A having the configuration illustrated in FIG. 7 is installed on a railroad car.

In FIGS. 4 and 5, the train car traveling direction signal Rev is input to the control apparatuses 100A1 and 100A2 via the host control unit 33 and the operation control device 34, but may be directly input from an operation device 35 as illustrated in FIGS. 7 and 8. The operation device 35 is a command device to be provided in a cab of a railroad car.

When railroad cars are traveling in, for example, a left direction in the drawing, an operation device 35a located in front in a train car traveling direction outputs a signal "F" as the train car traveling direction signal Rev to a signal line 36. The control apparatuses 100A1 and 100A2 can recognize the traveling direction of the railroad cars by receiving the train car traveling direction signal Rev through the signal line 36.

In addition, when the railroad cars are traveling in, for example, a right direction in the drawing, an operation device 35b located in front in the train car traveling direction outputs a signal "F" as the train car traveling direction signal Rev to a signal line 38. The control apparatuses 100A1 and 100A2 can recognize the traveling direction of the railroad cars by receiving the train car traveling direction signal Rev through the signal line 38.

As described above, the rotary machine control apparatus according to the second embodiment is installed on a railroad car, and rotation information regarding the direction of rotation of a rotary machine is generated by use of a train car traveling direction signal indicating the traveling direction of the railroad car. As a result, the rotary machine control apparatus according to the second embodiment can generate high-frequency voltage by using the train car traveling direction signal as the rotation information. Furthermore, according to the rotary machine control apparatus of the second embodiment, the speed calculator described in the first embodiment is unnecessary. As a result, it is possible to achieve the effect of simplifying the configuration of the apparatus as compared with the first embodiment in addition to the effect of the first embodiment.

Note that, in the rotary machine control apparatus according to the second embodiment, the train car traveling direction signal may be generated by use of a train car direction switching signal generated when the traveling direction of the train car is switched. Alternatively, the train car traveling direction signal may be generated by use of upbound and downbound information on train car operation, output from the operation control device installed on the railroad car. Alternatively, the train car traveling direction signal may be directly input to the control apparatus from the operation device provided in the cab of the railroad car. With any of these configurations, it is possible to achieve the effect of simplifying the configuration of the apparatus in addition to the effect of the first embodiment.

Third Embodiment

Figure 9:
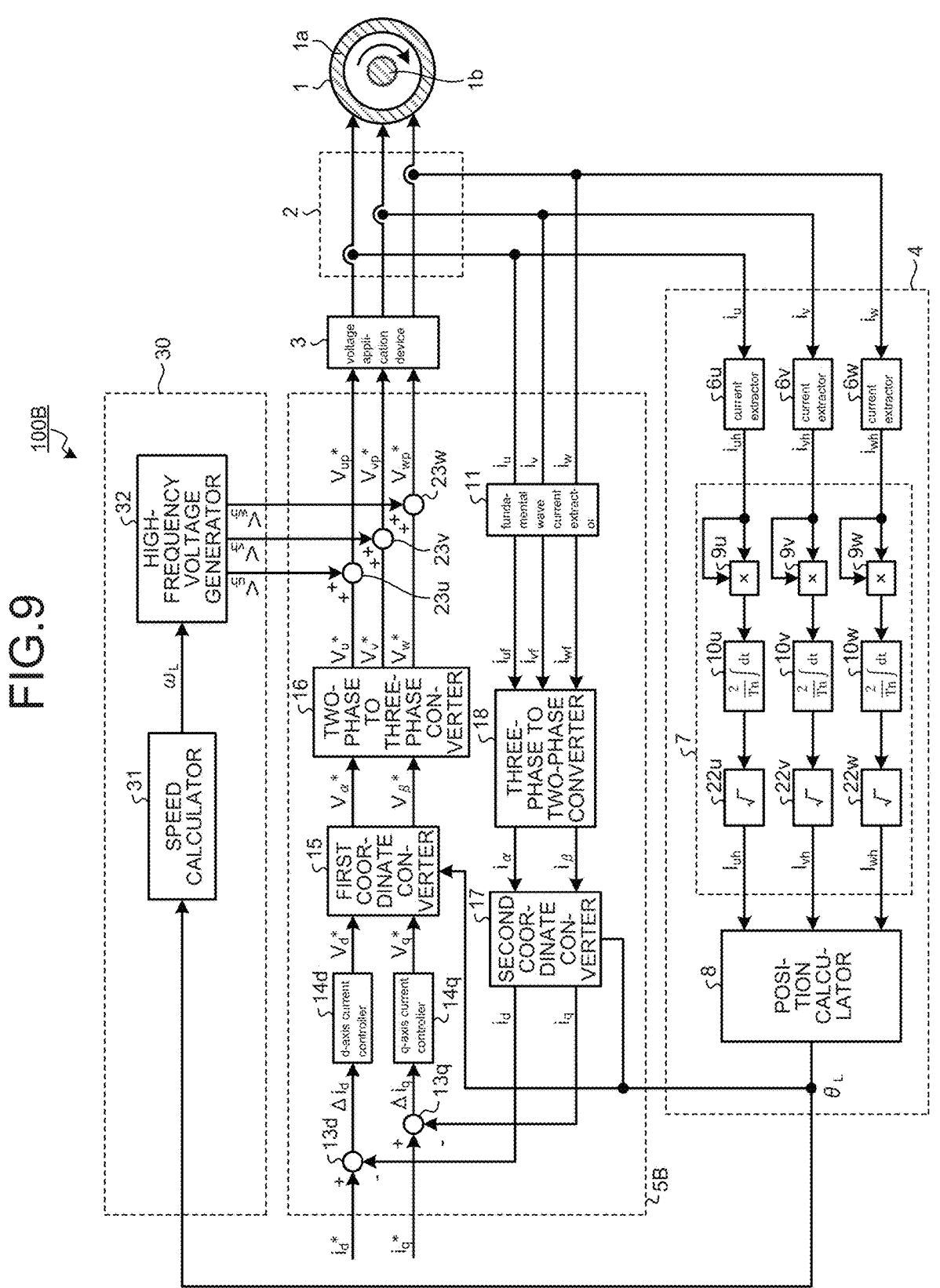
FIG. 9 is a diagram illustrating an exemplary configuration of a rotary machine control apparatus according to a third embodiment.

FIG. 9 is a diagram illustrating an exemplary configuration of a rotary machine control apparatus 100B according to a third embodiment. Comparing the control apparatus 100B according to the third embodiment with the control apparatus 100 illustrated in FIG. 1, the current control unit 5 has been replaced with a current control unit 58 in FIG. 9. Furthermore, a fundamental wave current extractor 11 has been added to the configuration of the current control unit 5 illustrated in FIG. 1 to obtain the current control unit 5B. Except for these points, the configuration of the control apparatus 100B is the same as or equivalent to the configuration of the control apparatus 100. Thus, the same or equivalent constituent parts are designated by the same reference numerals, and redundant description will be omitted.

As described above, high-frequency current including a superimposed frequency component and a sideband component is a disturbance for a current control system. Therefore, it is desirable that the frequency of high-frequency current be widely different from the response frequency of the current control system. Meanwhile, for the purpose of ensuring calculation time and reducing noise, superimposed frequency is set to a lower frequency in some cases. Thus, the response frequency of the current control system and superimposed frequency may be set closer to each other. This adversely affects processing to be performed in the current control system. In addition, as described above, a sideband component is distributed over a wide area in an application in which the number of revolutions of a rotary machine is high. This adversely affects processing to be performed in the current control system.

Therefore, in the third embodiment, the fundamental wave current extractor 11 is provided so as to remove or reduce the effect of high-frequency current generated as a result of application of the high-frequency voltages $V_{uh}$, $V_{vh}$, and $V_{wh}$. As illustrated in FIG. 9, the fundamental wave current extractor 11 is disposed between the current detection unit 2 and the three-phase to two-phase converter 18, that is, at a stage preceding the three-phase to two-phase converter 18.

The fundamental wave current extractor 11 extracts fundamental wave currents $i_{uf}$, $i_{vf}$, and $i_{wf}$ obtained by removal or attenuation of the same frequency components as frequency components of the high-frequency voltages $V_{uh}$, $V_{vh}$, and $V_{wh}$, from the rotary machine currents $i_u$, $i_v$, and $i_w$ detected by the current detection unit 2, respectively. A low-pass filter or a notch filter can be used to extract the fundamental wave currents $i_{uf}$, $i_{vf}$, and $i_{wf}$. The three-phase to two-phase converter 18 performs the processing described in the first embodiment by using the fundamental wave currents $i_{uf}$, $i_{vf}$, and $i_{wf}$ as input signals. The subsequent processing is the same as that described in the first embodiment.

According to the control apparatus 100B of the third embodiment, a superimposed frequency component and a sideband component thereof in the high-frequency currents $i_{uh}$, $i_{vh}$, and $i_{wh}$ are sufficiently removed from the rotary machine currants $i_u$, $i_v$, and $i_w$ detected by the current detection unit 2, respectively, in the processing to be performed in the current control unit 58 which is a current control system. As a result, it is possible to prevent adverse effects on the current control system, such as deterioration or instability of response.

As described above, according to the rotary machine control apparatus of the third embodiment, a fundamental wave component extractor extracts a fundamental wave component by removing a harmonic superimposed component included in a detection value of rotary machine current. Then, the current control unit generates a first voltage command based on an output from the fundamental wave component extractor and an estimate value of a rotor position. As a result, it is possible to reliably prevent adverse effects on the current control system, such as deterioration or instability of response.

Note that, in the third embodiment, the configuration in which the fundamental wave current extractor 11 is provided between the current detection unit 2 and the three-phase to two-phase converter 18 has been applied to the configuration of the first embodiment illustrated in FIG. 1, but the configuration of the third embodiment is not limited to this configuration. Needless to say, the configuration in which the fundamental wave current extractor 11 is provided between the current detection unit 2 and the three-phase to two-phase converter 18 may be applied to the configuration of the second embodiment illustrated in FIG. 4.

Furthermore, examples of superimposing high-frequency voltage on the three-phase coordinates that are fixed coordinates have been described in the first to third embodiments. However, Superimposition of high-frequency voltage is not limited thereto. The current control units 5 and 5B may be configured such that high-frequency voltage is superimposed on rotating coordinates. Even when high-frequency voltage is superimposed on the rotating coordinates, a similar sideband is generated. Therefore, even in a case where rotating voltage is superimposed on the rotating coordinates, it is possible to achieve the effects of the first to third embodiments described above by generating high-frequency voltage such that an upper sideband is constantly generated.

Figure 10:
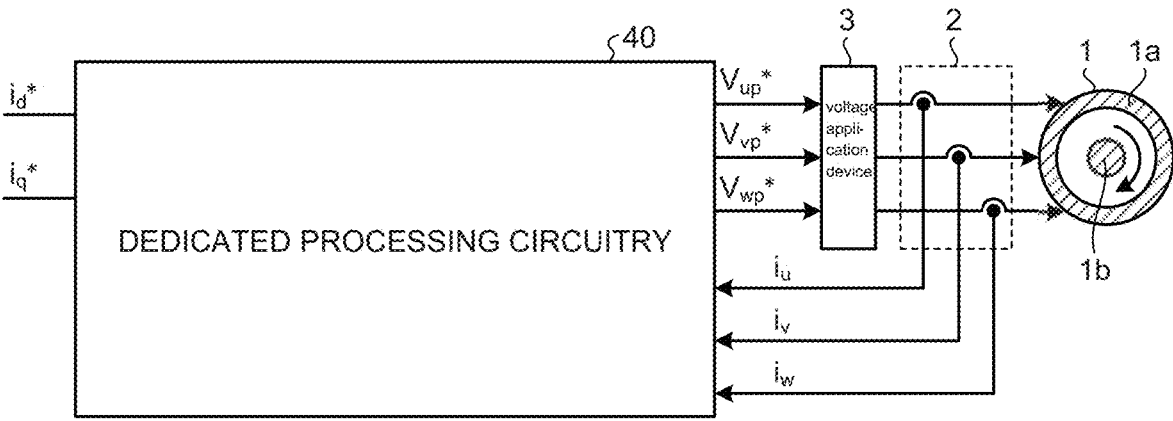
FIG. 10 is a diagram illustrating a first exemplary configuration of hardware that implements each function of the control apparatuses according to the first to third embodiments.
Figure 11:
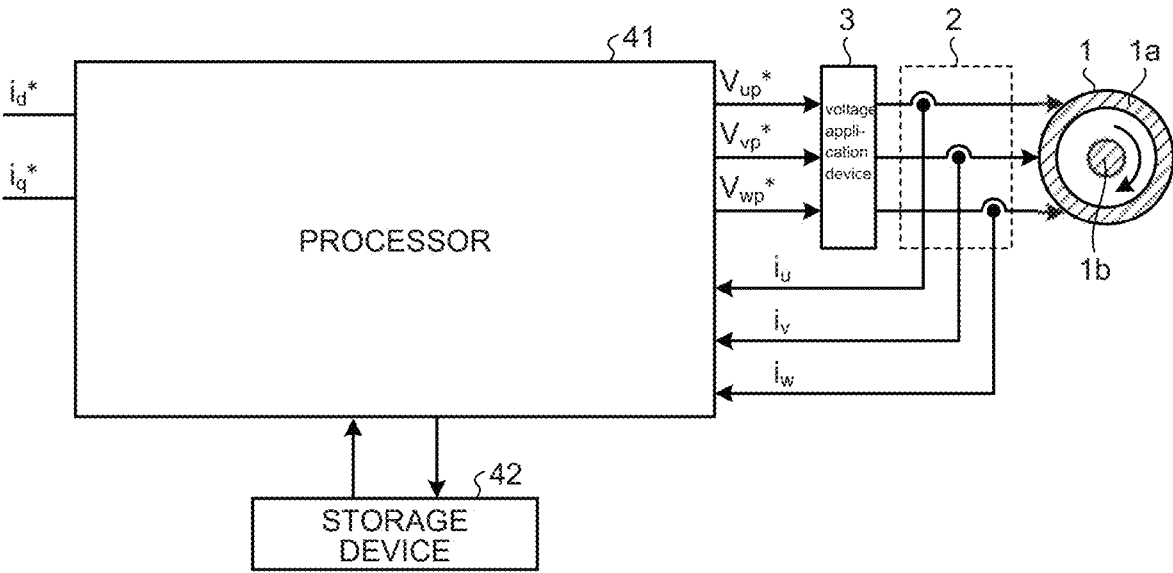
FIG. 11 is a diagram illustrating a second exemplary configuration of hardware that implements each function of the control apparatuses according to the first to third embodiments.

Next, hardware configurations of the control apparatuses 100, 100A, and 100B according to the first to third embodiments described above will be described with reference to FIGS. 10 and 11. FIG. 10 is a diagram illustrating a first exemplary configuration of hardware that implements each function of the control apparatuses 100, 100A, and 100B according to the first to third embodiments. FIG. 11 is a diagram illustrating a second exemplary configuration of hardware that implements each function of the control apparatuses 100, 100A, and 100B according to the first to third embodiments. Note that each function of the control apparatuses 100, 1004, and 1008 refers to each of the functions of the position estimation unit 4, the current control units 5 and 5B, and the position estimation voltage generation units 30 and 304 included in the control apparatuses 100, 100A, and 100B.

Each of the functions of the position estimation unit 4, the current control units 5 and 5B, and the position estimation voltage generation units 30 and 30A can be implemented by use of processing circuitry. In FIG. 10, the position estimation unit 4, the current control units 5 and 58, and the position estimation voltage generation units 30 and 30A in the first to third embodiments have been replaced with dedicated processing circuitry 40. In a case where dedicated hardware is used, the dedicated processing circuitry 40 corresponds to a single circuit, a composite circuit, an application specific integrated circuit (ASIC), a field-programmable gate array (FPGA), or a combination thereof. The functions of the position estimation unit 4, the current control units 5 and 5B, and the position estimation voltage generation units 30 and 30M may each be implemented by processing circuitry, or may be collectively implemented by processing circuitry.

Furthermore, in FIG. 11, the position estimation unit 4, the current control units 5 and 5B, and the position estimation voltage generation units 30 and 30A in the configurations of the first to third embodiments have been replaced with a processor 41 and a storage device 42. The processor 41 may be an arithmetic means such as an arithmetic unit, a microprocessor, a microcomputer, a central processing unit (CPU), or a digital signal processor (DSP). In addition, examples of the storage device 42 include nonvolatile or volatile semiconductor memories such as a random access memory (RAM), a read only memory (ROM), a flash memory, an erasable programmable ROM (EPROM), and an electrically EPROM (EEPROM (registered trademark)).

In a case where the processor 41 and the storage device 42 are used, each of the functions of the position estimation unit 4, the current control units 5 and 5B, and the position estimation voltage generation units 30 and 30A is implemented by software, firmware, or a combination thereof. The software or firmware is described as a program, and stored in the storage device 42. The processor 41 reads and executes such programs stored in the storage device 42. Furthermore, it can also be said that these programs cause a computer to execute procedures and methods for the respective functions of the position estimation unit 4, the current control units 5 and 58, and the position estimation voltage generation units 30 and 30A. For example, a nonvolatile or volatile semiconductor memory such as a ROM, EPROM, or EEPROM, a flexible disk, an optical disk, a compact disk, or a DVD can be used as the storage device 42.

Some of the functions of the position estimation unit 4, the current control units 5 and 58, and the position estimation voltage generation units 30 and 30A may be implemented by hardware, and other functions thereof may be implemented by software or firmware. For example, the functions of the position estimation voltage generation units 30 and 30A may be implemented by use of dedicated hardware, and the functions of the position estimation unit 4 and the current control units 5 and 58 may be implemented by use of the processor 41 and the storage device 42.

The configurations set forth in the above embodiments show examples, and it is possible to combine the configurations with another known technique or combine the embodiments with each other, and is also possible to partially omit or change the configurations without departing from the scope of the present disclosure.

REFERENCE SIGNS LIST

1 rotary machine; 1a stator; 1b rotor; 2 current detection unit; 3 voltage application device, 4 position estimation unit; 5, 58 current control unit, 6u, 6v, 6w current extractor; 7 high-frequency current amplitude calculation unit; 8 position calculator; 9u, 9v, 9w multiplier; 10u, 10v, 10w integrator; 11 fundamental wave current extractor; 13d, 13g subtracter; 14d d-axis current controller; 14q q-axis current controller; 15 first coordinate converter; 16 two-phase to three-phase converter; 17 second coordinate converter; 18 three-phase to two-phase converter; 22u, 22v, 22w square root calculator; 23u, 23v, 23w adder; 30, 30A position estimation voltage generation unit; 31 speed calculator; 32, 32A high-frequency voltage generator; 33 host control unit; 34, 34a, 34b operation control device; 35, 35a, 35b operation device; 36, 38 signal line; 40 dedicated processing circuitry; 41 processor, 42 storage device; 100, 100A, 100A1, 100A2, 100B control apparatus.

The invention claimed is:

1. A rotary machine control apparatus comprising:
   a current detector to detect a rotary machine current flowing to a rotary machine;
   a position estimator to calculate an estimate value of a rotor position based on the rotary machine current, the rotor position being position information on a rotor of the rotary machine;
   a current controller to generate a first voltage command based on a detection value of the rotary machine current and the estimate value of the rotor position, the first voltage command being a command value of rotary machine voltage for driving the rotary machine;
   a position estimation voltage generator to generate a high-frequency voltage based on rotation information regarding direction of rotation of the rotor, the high-frequency voltage being a position estimation voltage for estimating the rotor position, the high-frequency voltage having a frequency higher than a frequency of the first voltage command; and
   a voltage application device to apply a driving voltage to the rotary machine based on a second voltage command, the second voltage command being a voltage command obtained by superimposition of the position estimation voltage on the first voltage command.

2. The rotary machine control apparatus according to claim 1, wherein
   the position estimation voltage generator includes a speed calculator to calculate an estimate value of rotational speed based on the estimate value of the rotor position, the estimate value of rotational speed being speed information on the rotor, and
   the position estimation voltage generator generates the position estimation voltage by using the estimate value of rotational speed as the rotation information.

3. The rotary machine control apparatus according to claim 1, wherein
   the rotation information is input to the position estimation voltage generator from outside the control apparatus.

4. The rotary machine control apparatus according to claim 2, wherein
   the position estimation voltage generator generates a high-frequency voltage that allows an upper sideband to be constantly generated.

5. The rotary machine control apparatus according to claim 4, wherein
   the control apparatus is installed on a railroad car, and
   the rotation information is generated by use of a train car traveling direction signal indicating a traveling direction of the railroad car.

6. The rotary machine control apparatus according to claim 5, wherein
   the train car traveling direction signal is generated by use of a train car direction switching signal, the train car direction switching signal being generated when the traveling direction of the railroad car is switched.

7. The rotary machine control apparatus according to claim 5, wherein
   the train car traveling direction signal is output from an operation device provided in a cab of the railroad car.

8. The rotary machine control apparatus according to claim 1, wherein
   the current controller includes a fundamental wave component extractor to extract a fundamental wave component by removing a harmonic superimposed component included in the detection value of the rotary machine current, and
   the current controller generates the first voltage command based on an output from the fundamental wave component extractor and the estimate value of the rotor position.

9. The rotary machine control apparatus according to claim 3, wherein
   the position estimation voltage generator generates a high-frequency voltage that allows an upper sideband to be constantly generated.

10. The rotary machine control apparatus according to claim 9, wherein the control apparatus is installed on a railroad car, and the rotation information is generated by use of a train car traveling direction signal indicating a traveling direction of the railroad car.

11. The rotary machine control apparatus according to claim 10, wherein the train car traveling direction signal is generated by use of a train car direction switching signal, the train car direction switching signal being generated when the traveling direction of the railroad car is switched.

12. The rotary machine control apparatus according to claim 10, wherein the train car traveling direction signal is output from an operation device provided in a cab of the railroad car.

\* \* \* \* \*